Figure 1:
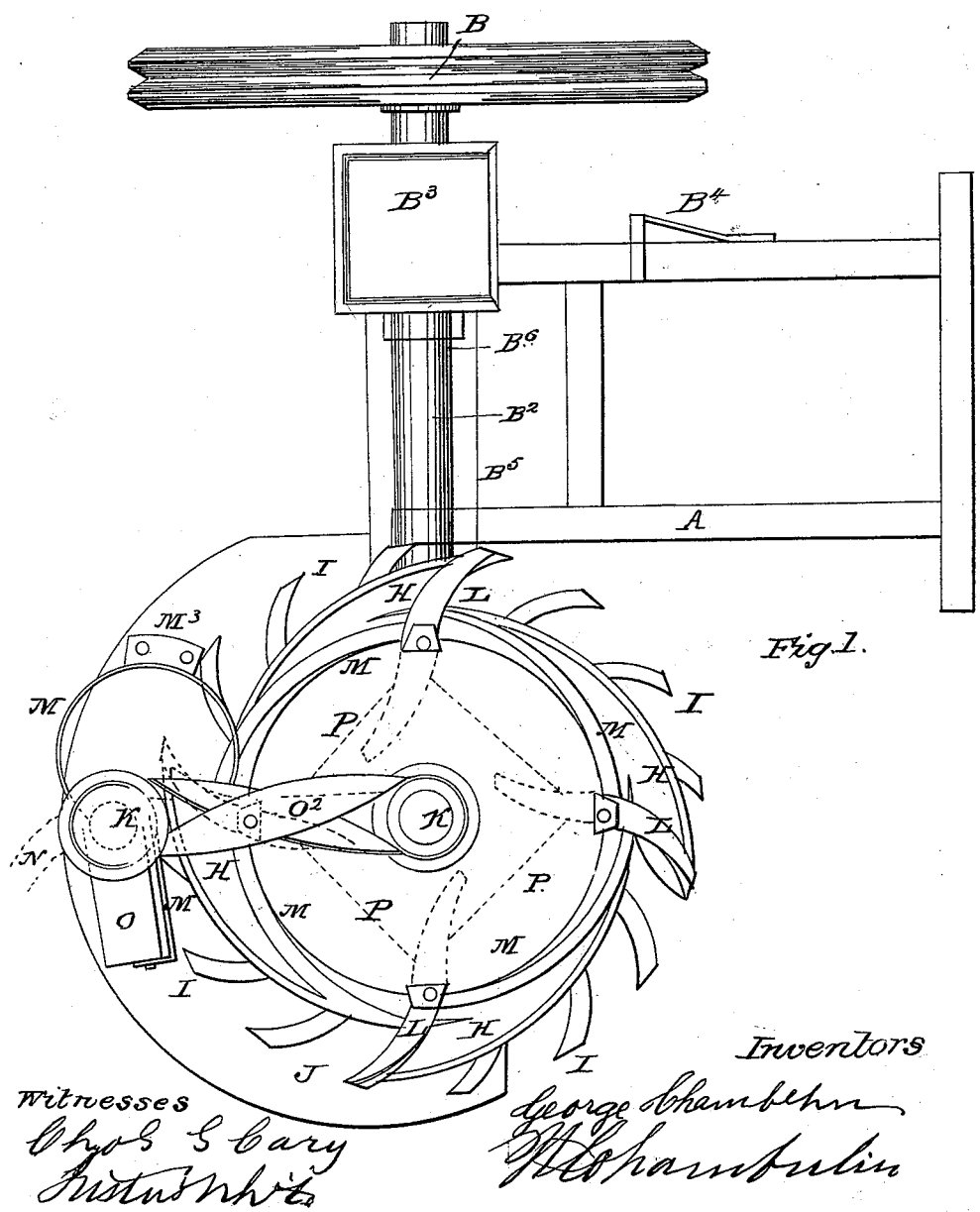

G. & W. CHAMBERLIN.
Harvester.

No. 23,756.

2 Sheets—Sheet 1.

Patented April 26, 1859.

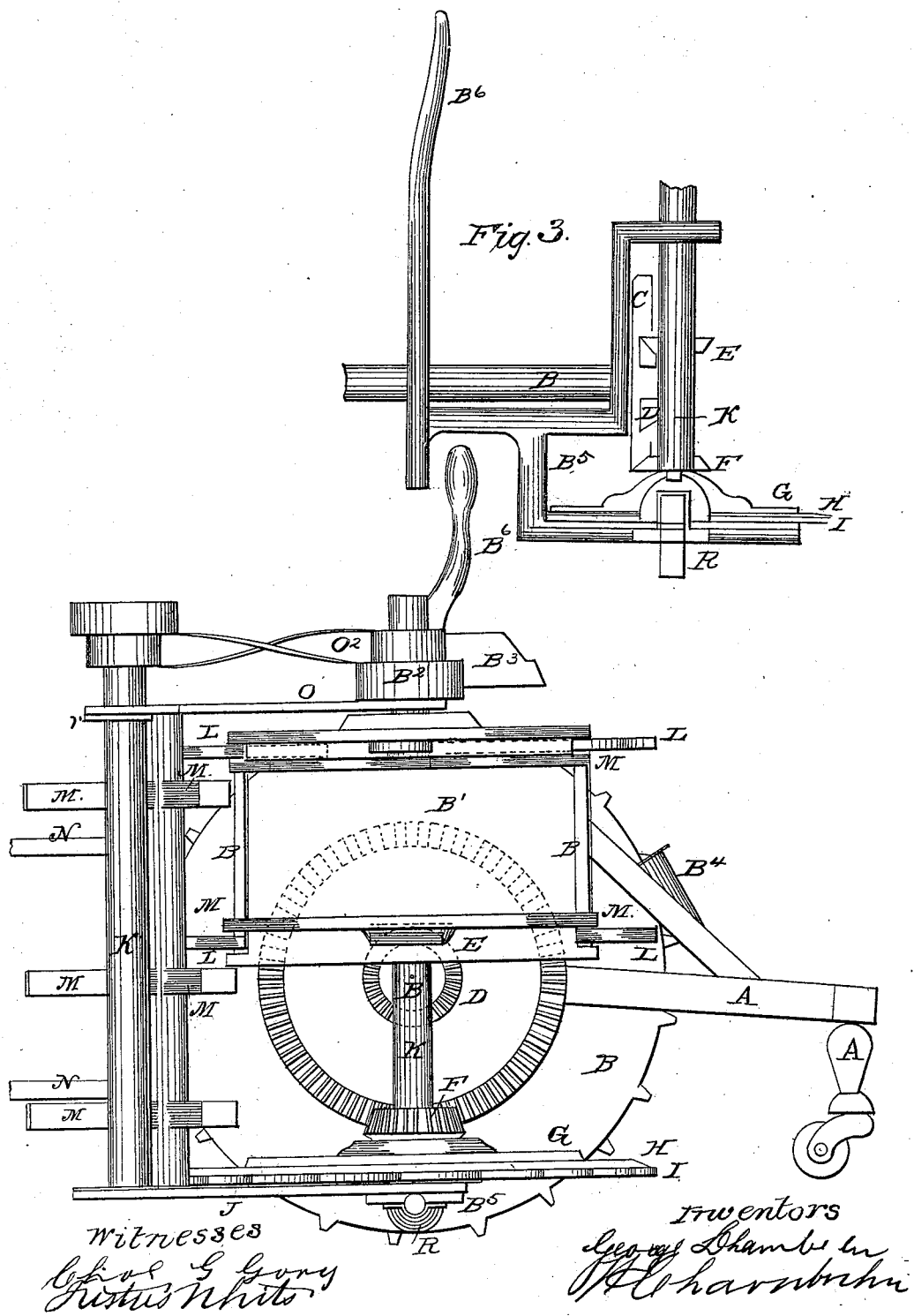

UNITED STATES PATENT OFFICE.

GEO. CHAMBERLIN AND WM. CHAMBERLIN, OF OLEAN, NEW YORK.

IMPROVEMENT IN HARVESTING-MACHINES.

Specification forming part of Letters Patent No. 23,756, dated April 26, 1859.

*To all whom it may concern:*

Be it known that we, GEO. CHAMBERLIN and WM. CHAMBERLIN, of Olean, in the county of Cattaraugus, in the State of New York, have invented a new and Improved Mode of Constructing Reapers; and we hereby declare that the following is a full and exact description thereof, reference being had to the accompanying drawings, and to the letters of reference marked thereon.

The nature of our invention relates to certain improvements in the arrangement and combination of the cutters, gathering and discharging fingers, with the reel, in a reaping machine having a revolving cutting apparatus, as will be hereinafter described.

To enable others skilled in the art to make and use our invention, we will proceed to describe its construction and operation, the letters of reference on the respective figures referring to the same parts, in which—

Figure 1 is a plan, and Fig. 2 is a side view, of the machine, and Fig. 3 a section of the arm $B^5$ and shafts $B^2$ and K.

A is the draft piece or reach, and B the driving or main wheel, and R a central wheel or truck for the purpose of giving any desired angle of inclination to the knives and gathering-fingers; $B^2$, the axle; $R^3$, the driver's seat; $B^4$, a foot-piece.

$B^5$ is an arm attached to the axle, and to which all the other gear-work is attached, and on which the bottom plate, J, rests, and to which it is secured by bolts, and the journal of the center pulley, R, also rests in this arm $B^5$.

$B^6$ is a lever by which the operator varies the inclination of the gathering-fingers and knives I and H.

K is an upright shaft to which the pinions E and F are attached. These pinions receive their motion from the wheel C, which is attached to the main shaft $B^2$, the pinion E being made fast to the shaft and carrying the gathering-fingers, while the pinion F, to which the plate G and cutters H are attached, works loosely on the shaft, the fingers and cutters being made to revolve in opposite directions and forming shears in their cutting operation. L the reel. M are circular arms for the purpose of throwing the grain, after it is cut off, away from the reel and into the slats or springs formed by M', the slats $M^2$ serving to keep the grain in an upright position until it is thrown into the receiver by the arms M, and then carried out by the dischargers N, when it falls to the ground, ready to be bound. These arms M, and also the reel-arms L, are both attached to the upright shaft $L^2$, and the ends of the arms L are made to extend inward until they will come in contact with the end of the arm $B^5$, which causes each one to be tripped as the wheel revolves, and the springs P (indicated by the red lines) serve to keep them continually in a working position, carrying the grain along into the receiver as it is cut off and thrown out as readily by the discharge N, attached to the shaft K', which receives its motion from the main shaft $B^2$, communicated to the belt $O^2$. The supports O and O' answer as stays or braces to the shaft K', and also to the springs $M^2$, and the stay $M^3$, Fig. 1, is attached to the plate J. Slats M' are attached to $M^3$, forming what we term the "spring-receiver," and is so formed that it gives way readily on the grain being pressed against it by the dischargers N. H are the cutters or knives, and I the gathering-fingers, which work in reverse directions. The wheel or truck R, which has its bearing on the arm $B^5$, is made convex to suit the size of the wheel to be used. The caster and truck A' are for the purpose of giving steadiness to the frame or draft-piece A. As the machine is propelled forward motion is given to the driving-wheel B and communicated to the cylinder B' by the wheels C, D, E, and F, and by the belt $O^2$ motion is given to the shaft K' and dischargers N, which completes the operation of the machine.

Having thus fully described our machine, what we claim as our invention, and desire to secure by Letters Patent, is—

The combination and arrangement of the gathering-fingers I and knives H with the reel L, arms M, receiver M', and dischargers N, when the several parts are constructed and operated as hereinbefore specified.

GEORGE CHAMBERLIN.
W. CHAMBERLIN.

Witnesses:
CHAS. G. CARY,
JUSTUS WHITE.